Feb. 14, 1928.
W. E. HOKE
1,658,899
METHOD OF AND APPARATUS FOR WEARING-IN GEARS
Filed Jan. 11, 1924  2 Sheets-Sheet 1
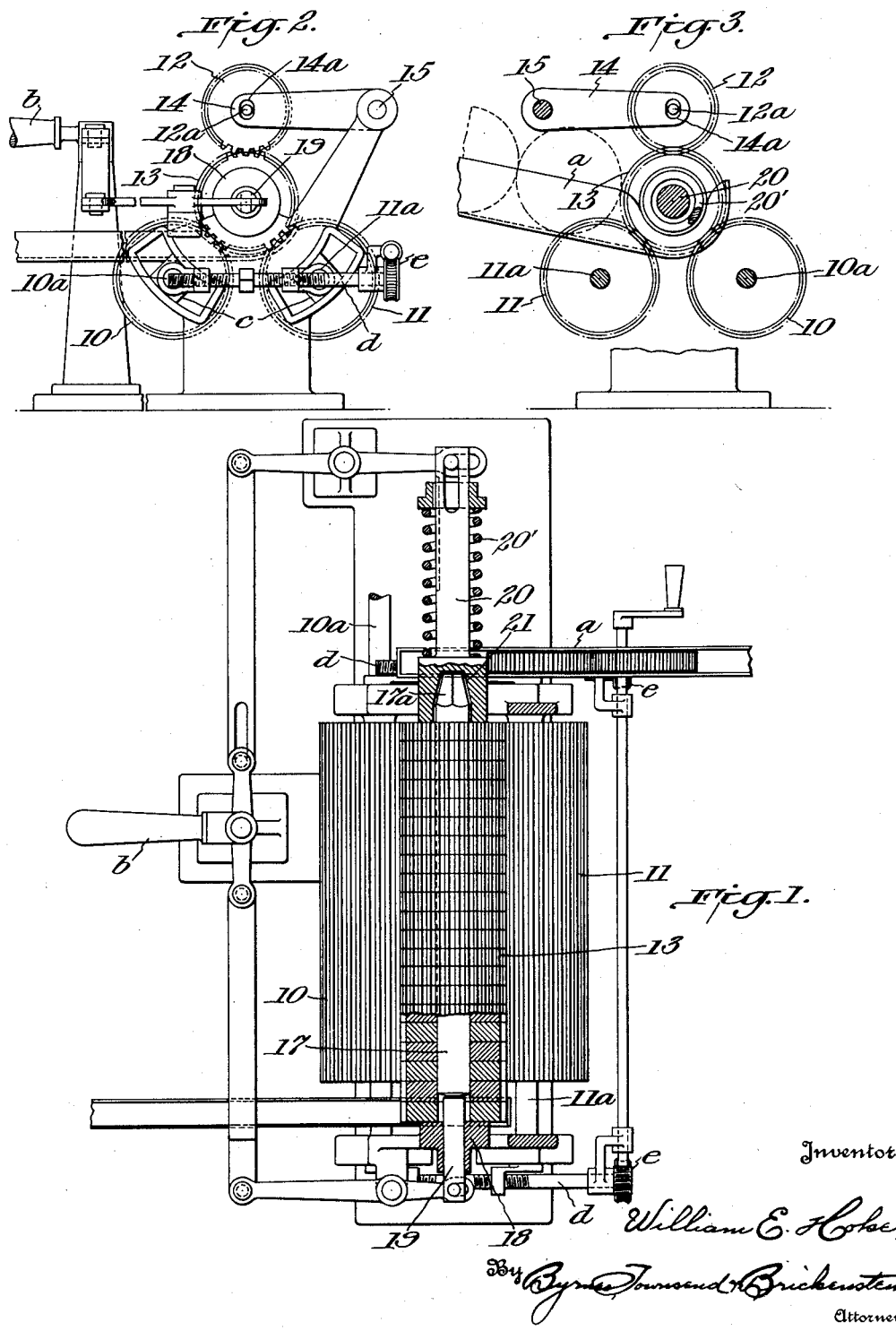

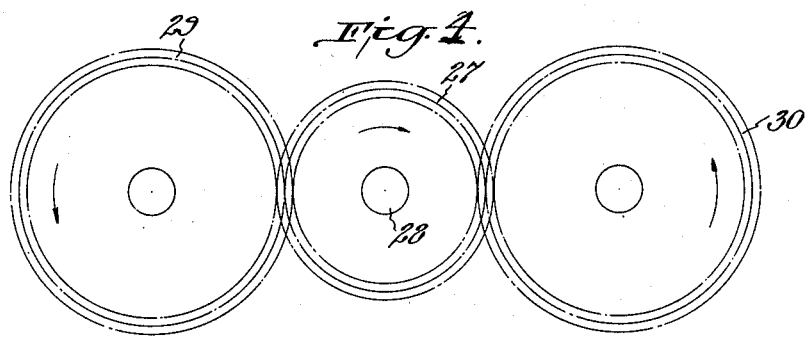
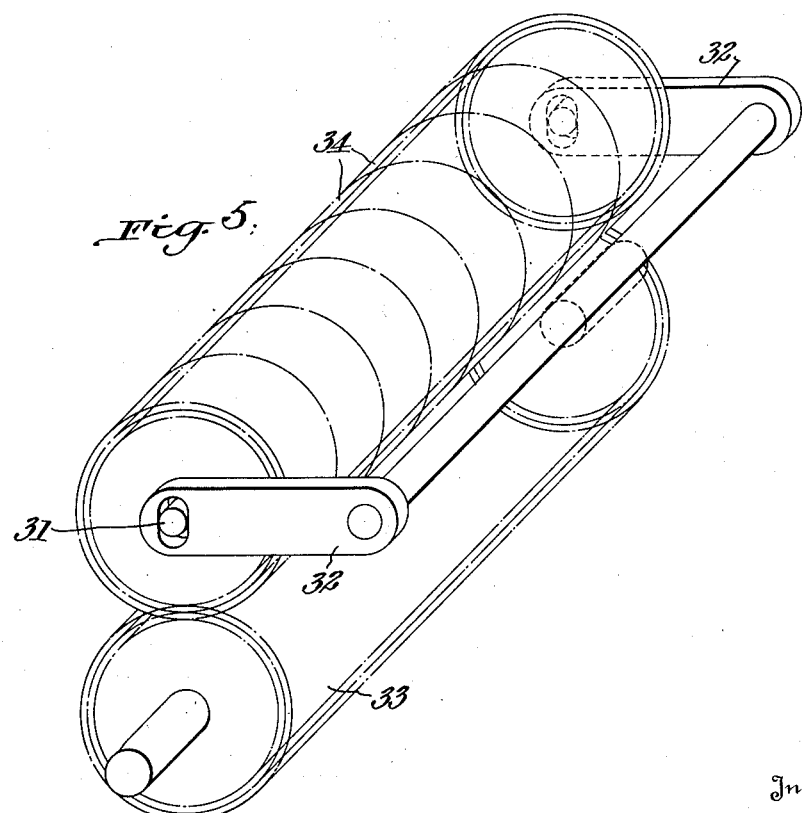

Patented Feb. 14, 1928.

1,658,899

UNITED STATES PATENT OFFICE.

WILLIAM E. HOKE, OF BALTIMORE, MARYLAND.

METHOD OF AND APPARATUS FOR WEARING IN GEARS.

Application filed January 11, 1924. Serial No. 685,687.

This invention relates to a method of and apparatus for finishing gears accurately.

In the manufacture of gears, particularly those used in automobile transmission, it has heretofore been the practice to machine and harden the gears and in addition to subject them to a finishing process termed "wearing them in". The purpose of this process is to eliminate roughness which would result in noisy operation.

It is an object of the present invention to provide a simple process of finishing the tooth surfaces of gears.

It is another object to provide a simple apparatus which receives the gear blanks or unfinished gears and delivers the gears in accurately finished conditions.

It is a special object of the invention to provide an apparatus by which gears may be finished automatically i. e. in such a way that the necessity of supervision is substantially eliminated and that the only inherently indispensable human effort or labor involved is the supply at longer intervals of larger quantities of unfinished gears.

For a full understanding of the invention reference is made to the accompanying drawings in which, Fig. 1 is a schematic representation in plan of an arrangement embodying the invention, certain parts being omitted for the sake of clearness;

Fig. 2 is an end view of the arrangement shown in Fig. 1, looking at the discharge end;

Fig. 3 is a partial diagrammatic end view of the feed-in end;

Fig. 4 is a diagrammatic representation of a modified form of the invention; and Fig. 5 is a perspective view of another embodiment.

It should be noted at the very outset that the invention is based on an entirely new mode of operation and on an entirely new idea of means in which mechanical detail has no primary significance in the sense that many constructional detail arrangements may be devised for carrying the invention into execution and that a skilled mechanic can amply draw from the prior art in general to carry the law of operation into effect.

For this reason I have illustrated only so much as is necessary to explain the principle of operation and means generally for carrying it into effect.

In the drawings 10, 11 and 12 represent three lapping gears of considerable axial length, as indicated in Fig. 1. The length may be so chosen that a column or stack of gears to be finished may be maintained in mesh at the same time, say a stack of twenty unfinished gears.

While two of the lapping gears, 10 and 11, are preferably mounted on fixed shafts, the third gear 12 is preferably mounted as a freely floating lapping gear. As indicated in Fig. 1, the gears 10 and 11 may be mounted on horizontal shafts 10$^a$ and 11$^a$ lying preferably in an approximately horizontal plane while the third lapping gear 12 is mounted, as shown in Figs. 2 and 3, to freely rest upon the stack of blank gears 13 disposed upon the gears 10 and 11 and in mesh therewith.

The mounting of gear 12 must be essentially such that it freely floats upon the stack of gears to be finished i. e. the gear 12 must be free to accommodate itself to any position dictated by the interaction between the stack of unfinished gears and the lapping gears.

There is considerable latitude in respect to the mounting of gear 12. For the purpose of illustration only I have indicated a simple arrangement satisfactory for the purpose.

The shaft 12$^a$ of gear 12 may be carried at the free ends of links 14 interconnected at their other ends by a shaft 15. The links 14 preferably have slots 14$^a$ in which the ends of the shaft 12$^a$ may have a limited vertical as well as lateral movement.

The stack of gears to be finished is mounted upon a centering arbor 17 which extends a short distance beyond opposite ends of the lapping gears. Adjacent one end of this arbor 17 is disposed an abutment 18 through which extends a spindle 19 in alignment with the centering arbor 17 and normally in abutting relation therewith. The spindle 19 is movable relatively to the abutment and may be retracted in any suitable manner or by any suitable means such as the link and lever mechanism shown, so that a gap is formed between the end of the centering arbor and the abutment to allow a finished gear 13 to drop through. As an alternative, the gap may be formed partly by movement of the abutment and relative movement between the latter and the spindle 19, as is well understood.

Adjacent the opposite end of arbor 17 and in alignment therewith is a loading ram 20. This ram has a socket element, the tapering angular socket 21 of which approximately fits over a correspondingly shaped tapered angular end 17$^a$ of the arbor 17. The ram normally presses against the stack 13 of unfinished gears, preferably under the influence of some yielding agent, such as the spring 20′, and at the same time holds the centering arbor 17 against rotation. When the center holes have been accurately ground it is preferable to allow the arbor to revolve with the gears mounted thereon.

The stack of gears 13 bears against the abutment 18. When the spindle 19 is withdrawn or the abutment 18 together with the spindle 19 is retracted, the last gear of the stack can drop and then the parts can be restored to their normal position. As will be readily understood, numerous and different mechanisms may be used for effecting a movement by which only the last gear is allowed to be removed, and the mechanism shown is merely illustrative.

The ram may be intermittently retracted to permit a replenishing of the stack. Gear blanks may be fed automatically to the centering arbor 17. A reserve stack of blank gears may be so placed and so maintained that upon withdrawal of the ram, the last member of the reserve stack can drop upon a suitable support, such as a trough $a$, in front of the ram and in alignment with the centering arbor 17 so that when the ram returns to its normal position it will then push the last fed blank gear upon the stack. Since the lapping gears are in substantially fixed angular relation, the last member of the stack will easily get into register and then the ram will advance the stack until the gap made by the removal of the last finished gear is filled.

In practice I propose to correlate mechanism for actuating the ram, the spindle 19 or spindle 19 together with abutment 18 in time controlled relation to automatically remove the finished gears and replenish the stack. As illustrative of this principle, I have shown a link and lever mechanism by which the ram 20 and spindle 19 are operatively interconnected, so as to be actuated simultaneously by a lever $b$. This lever may be periodically actuated by time-controlled mechanism to feed fresh blank gears to the ram and discharge finished gears from the arbor. A reserve stack of blank gears may be maintained in the position hereinbefore referred to either by gravity in the trough $a$ or by a spring actuated pusher element, not shown.

The shafts 10$^a$ and 11$^a$ may be made adjustable toward or away from each other. This may be done by mounting them in slide bearings $c$ and moving these bearings appropriately by right- and left-hand screws $d$ which may be simultaneously operated by worm gears $e$, as shown.

While in its broadest scope the invention may be carried out by manually effecting the removal of the finished gears and manually supplying fresh blank gears, the invention is primarily intended for automatic operation and is preferably carried out by mechanism, of the general character above referred to, for removing finished gears and replenishing the stack.

As the unfinished gears pass down the stack from one end to the other their teeth are gradually corrected. That tooth or those teeth which have the greatest irregularity or inaccuracy receive the greatest impact or are subjected most intensively to the lapping action. In general, the blank gears last entered upon the stack, not having been acted on, are the least accurate of the stack and therefore react more upon the lapping gears than those further advanced. The gear 12 has been made a floating gear so that it may readily yield and adapt itself to the particular varying conditions while maintaining its lapping action.

By holding the centering arbor 17 against rotation, by means of the angular socket 21 of ram 20 and the angular end 17$^a$ of the arbor, the center holes of the gears may be lapped and trued, in which case the arbor is made of softer metal so that it will become charged with abrasive.

The operation of the arrangement shown in Figs. 1, 2 and 3 is as follows:—One of the lapping gears 10 or 11 is arranged to be rotated or driven in any suitable manner to in turn rotate the other lapping gears and the stack of gears in mesh therewith. As the stack of gears is fed through the device, the tooth surfaces are subjected to the abrading action of the teeth of the lapping gears and gradually brought into accurate form, the freely-floating lapping gear permitting the free movement of the gears in the stack relative to each other and to the lapping gears, while they are still compelled to rotate.

One passage through the machine may be sufficient to finish the gears with commercial precision. If greater accuracy of tooth surfaces is required, the operation may be repeated, preferably with an interchange of the relative positions of the gears in the stack or by turning the gears face for face or otherwise, as fully explained in my application Serial No. 283,868, filed March 20, 1919.

While the construction shown in Figs. 1, 2 and 3 involves the use of three lapping gears, either a larger or smaller number may be employed.

Thus, as shown in Fig. 4, 27 is a stack of unfinished gears mounted upon a centering arbor 28, which may or may not be separately supported. 29 and 30 are lapping gears driven at uniform speed and in the same direction, the shafts of these gears being mounted in bearings, which are preferably adjustable with reference to each other. In this modification, the abrading operation is not quite the same as in the machine of Figs. 1, 2 and 3 in which the intermeshing teeth are forced radially into intermesh and the tooth space of the mating gear contacts on both sides. In this modification of Fig. 4, the grinding action occurs on both faces of each tooth, but one face is lapped by one lapping gear and the other face by the other lapping gear.

In this case, as in the other, the mutual interaction upon each other of the several gears in the stack while in engagement with the lapping gears, results in bringing the corresponding surfaces of all the teeth into accurate form and alignment.

A still further modification is possible in which only one lapping gear of considerable length is in engagement with a multiplicity of gears to be finished. This construction is shown in Figure 5 in which 34 is a stack or multiplicity of gears mounted on an arbor 31 loosely mounted, as shown, on pivoted links 32. The separate gears of the stack are preferably held in lateral frictional engagement with each other by any suitable means, such as by a spring. The lapping gear 33 is mounted in bearings and driven in any suitable manner. In this case, the weight of the stack of gears, which may be supplemented by spring pressure, if desired, is sufficient to produce the desired abrading action. In this case, as in the others, the teeth of all the gears are brought into an average correct form, because of the successive intermeshing of a row of teeth on each of the gears in the stack with teeth of the lapping gear.

In each of these cases, the novel feature is the simultaneous abrasion of the tooth surfaces of a number of gears to be finished, while held in centered relation to each other about a common axis and in intermesh with a lapping gear or gears under suitable abrading conditions.

I claim:

1. Method of finishing gear tooth surfaces, which consists in subjecting a column of gears to abrading action while in engagement with a gear of considerable axial length, maintaining the members of the column in centered relation with respect to each other, and successively removing gears from one end of the column and supplying new gear blanks at the other end of the column.

2. Method of finishing gear tooth surfaces, which consists in subjecting a column of gears to abrading action while in engagement with a plurality of gears of considerable axial length, maintaining the members of the column in centered relation with respect to each other, and successively removing finished gears from the column and supplying new gear blanks to maintain the same.

3. Apparatus for finishing gear tooth surfaces, comprising a gear of considerable axial length, means for maintaining a column of gear blanks in axial alignment in abrading contact with the gear and means for successively adding new gear blanks at one end and removing finished gears at the other end.

4. Apparatus according to claim 3 including means for pressing upon opposite ends of the column of gears to hold them against relative axial movement while in engagement with the said gear.

5. Apparatus according to claim 3 including means for yieldingly urging the column of gears into engagement with the said gear.

6. Apparatus for finishing gear tooth surfaces, comprising a plurality of rotative gears of considerable axial lengths and means for subjecting a column of gears in axial alignment with each other to abrading action in engagement with the said plurality of rotative gears.

7. Apparatus for finishing gear tooth surfaces, comprising a plurality of rotative gears of considerable axial lengths, an arbor for holding gears to be finished in axial alignment with each other, said plurality of gears being disposed to receive the column of gears on the arbor in mesh engagement and means for yieldingly urging the column of gears into engagement with said plurality of rotative gears.

8. Apparatus for finishing gear tooth surfaces, comprising a plurality of rotative gears of considerable axial lengths angularly disposed to receive a column of gears to be finished in mesh engagement, one of said plurality of rotative gears being mounted to press against the column of gears but to be free to move in response to counterpressure therefrom and in the direction of such counterpressure.

9. Apparatus for finishing gear tooth surfaces, comprising a plurality of gears of considerable axial lengths disposed in horizontal direction and angularly spaced to receive a column of gears to be finished in mesh engagement, one of said plurality of gears being mounted to freely float upon the column of gears and to be free to move in response to counterpressure therefrom and in the direction of such counterpressure.

10. Apparatus for finishing gear tooth surfaces, comprising a plurality of gears of considerable axial lengths angularly disposed to receive a column of gears to be finished in mesh engagement, and means for removing finished gears at one end of the column and adding gears to be finished at the other end of the column.

11. Apparatus for finishing gear tooth surfaces, comprising a plurality of gears of considerable axial lengths angularly disposed to receive a column of gears to be finished in mesh engagement, an arbor for centering the gears of the column relatively to one another, said arbor extending beyond opposite ends of the said plurality of gears, an abutment at one end of said arbor and means movable axially toward and away from the column for exerting pressure upon the other end of the column.

12. Apparatus according to claim 11 including means for holding the centering arbor stationary.

13. Apparatus according to claim 11 in which the said pressure-exerting means and the arbor have means cooperating to hold the latter against rotary motion.

14. Apparatus according to claim 9 in which the mounting for the floating gear includes means for permitting the latter to have a limited angular movement in planes extending at right angle to each other through its axis.

In testimony whereof, I affix my signature.

WILLIAM E. HOKE.